United States Patent
Peil

[15] 3,678,278
[45] July 18, 1972

[54] APPARATUS FOR BAGGAGE INSPECTION

[72] Inventor: Le Roy E. Peil, 1113 East Adams, Riverton, Wyo. 82501

[22] Filed: Jan. 26, 1970

[21] Appl. No.: 5,538

[52] U.S. Cl. ........................................... 250/108 R, 250/77
[51] Int. Cl. ................................................. G21f 7/00
[58] Field of Search .................. 250/106 T, 65 R, 108 R, 77; 324/41; 340/280

[56] References Cited

UNITED STATES PATENTS

| | | | |
|---|---|---|---|
| R20,641 | 1/1938 | Talty | 250/108 R X |
| 3,146,349 | 8/1964 | Jordan | 250/71.5 R |
| 3,488,495 | 1/1970 | Schneeman | 250/108 R X |
| 3,528,004 | 9/1970 | Katabami | 324/41 |

Primary Examiner—Archie R. Borchelt
Attorney—Drake, Crandell & Batchelder

[57] ABSTRACT

An inspection apparatus for use with an airline ticket and check-in counter includes an X-ray and fluoroscopic examination unit and a frequency modulation monitor, all positioned on a frame adjacent a baggage weighing platform. A sliding X-ray impervious shield is supported on the frame and is positioned over the weighing platform and baggage thereon during the X-ray inspection.

1 Claim, 3 Drawing Figures

PATENTED JUL 18 1972

3,678,278

INVENTOR
LEROY E. PEIL
BY
Drake & Crandell
ATTORNEYS

APPARATUS FOR BAGGAGE INSPECTION

BACKGROUND OF THE INVENTION

The present invention relates to inspection apparatus, and more specifically, to an apparatus finding particular, but not necessarily exclusive, utility for the inspection of baggage and like parcels at airline and other transportation terminal baggage check-in stations.

The inspection of baggage and parcels at airline ticket and check-in counters or the check-in counters of transportation terminals in general is difficult at best, and nearly impossible at peak travel times when may people and their baggage and parcels must be quickly checked-in for boarding. As a result, it is readily possible for bombs, explosive devices, weapons, contraband, stolen goods and the like to be smuggled through the check-in counters onto the aircraft or other vehicles. The problem is particularly acute with respect to explosive devices and weapons which are carried in baggage or parcels onto aircraft for the purpose of destroying or hijacking the airplane, with the resultant serious danger to the lives and property of the airline, crew and passengers. Also, custom inspections often require a laborious and time consuming examination of each individual piece of luggage, parcels and the like.

OBJECTS OF THE INVENTION

The principal object of the invention is to provide a simple, rugged and dependably accurate inspection device for use in inspecting baggage and parcels, and which is adapted for use at or in association with airline or other transportation check-in terminal counters.

Another object of the present invention is to provide a baggage inspection apparatus which may be readily incorporated as a part of a conventional airline or transportation terminal check-in counter.

A further object of the present invention is to provide an apparatus of the above character which can be installed in existing terminal counters inexpensively, in a minimum of time and without requiring a substantial modification of terminal facilities.

Another object of the present invention is to provide an inspection device which is safe for use in crowded terminals, is foolproof so as to prevent injury to passengers, counter clerks, and baggage or parcels, and provides an inspection which is readily apparent to both the check-in counter clerk and the passenger or parcel owner.

SUMMARY OF THE INVENTION

The foregoing objects are accomplished by inspection apparatus which comprises a main frame or chassis supporting a baggage weighing platform and scale. Mounted on the frame adjacent the weighing platform is an X-ray and fluoroscope for use in the examination of the baggage contents. A series of mirrors or closed circuit television enables the contents to be viewed at a remote point. To protect the clerks and passengers, a sliding X-ray impervious shield is slidingly supported on a frame superstructure, and is moved over the weighing platform and baggage thereon during X-ray operation. The frame also supports a frequency modulation monitor for frequency examination of the baggage or parcels. Appropriate control and indicator circuits are also utilized.

DESCRIPTION OF THE PREFERRED EMBODIMENT

Figure 1:
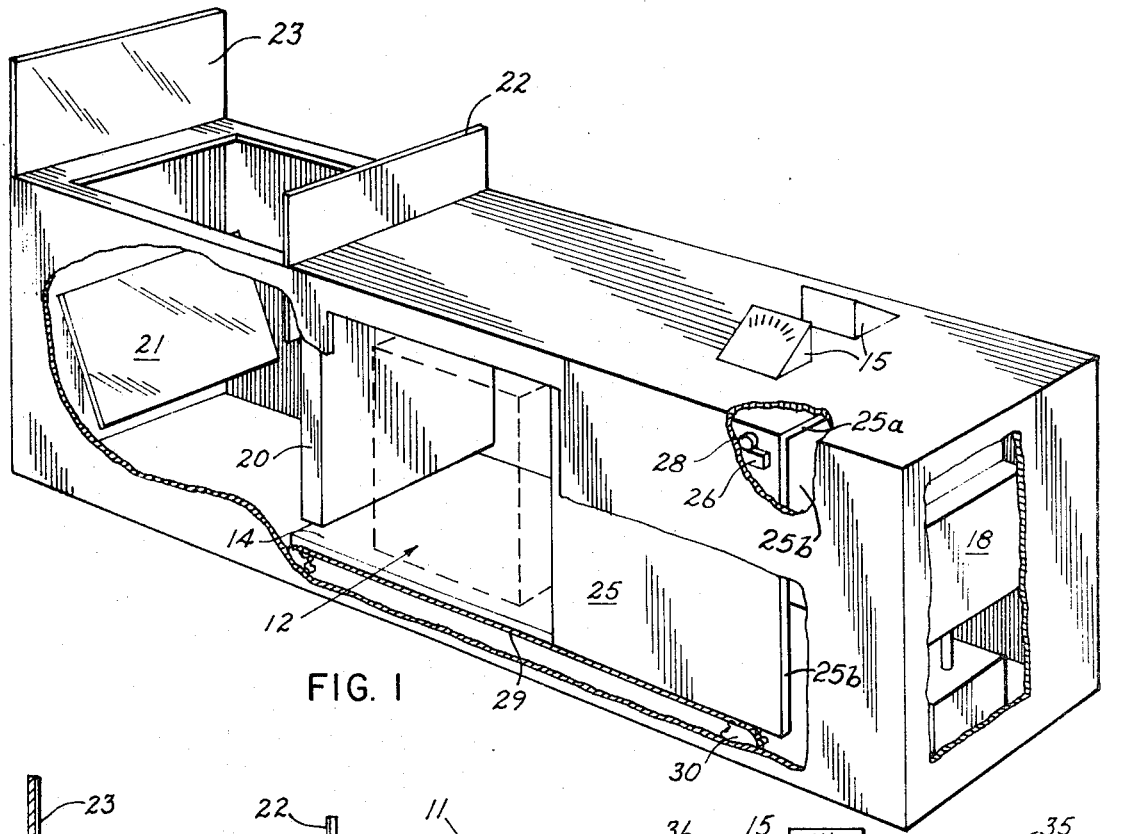
FIG. 1 is an isometric illustration of an inspection device embodying the present invention.
Figure 2:
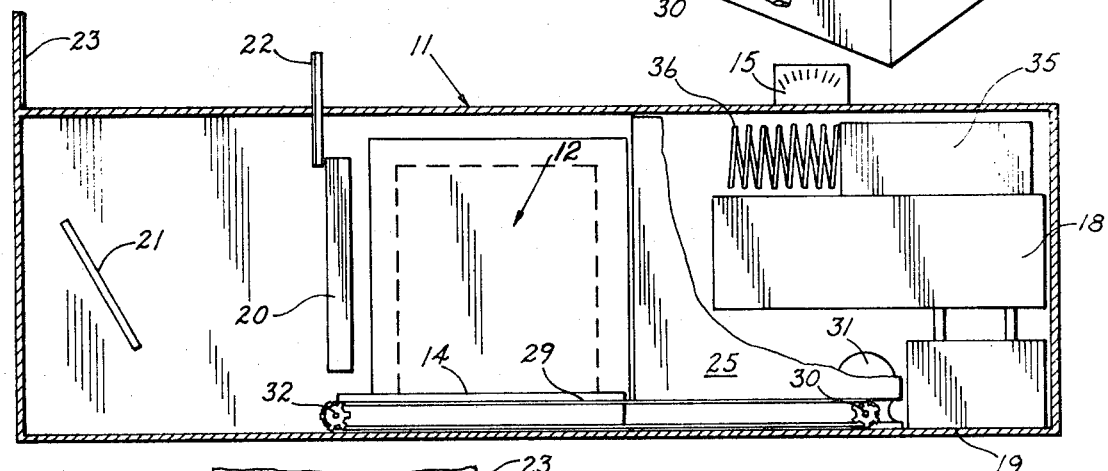
FIG. 2 is a side elevation view of the inspection apparatus shown in FIG. 1.
Figure 3:
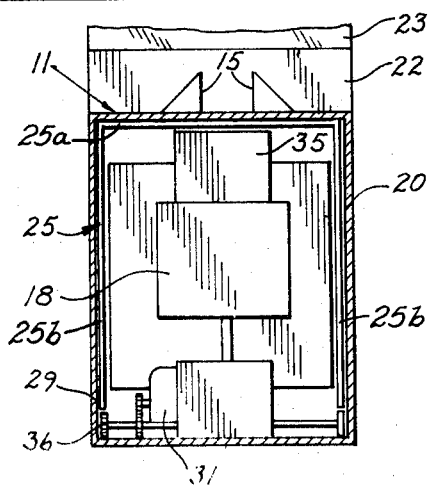
FIG. 3 is an end elevation view of the inspection apparatus shown in FIG. 2.

Inspection apparatus embodying the present invention, as illustrated in the drawing, and is adapted for use within or in association with a transportation terminal check-in and ticket counter. In the drawings, the apparatus is indicated generally at 10, and is mounted underneath a ticket counter 11. Such ticket counters 11 conventionally include an opening 12 for receiving baggage, luggage, parcels, etc. to be weighed on a scale platform 14. The weight of the item is indicated at the top of the counter 11 on an appropriate weight indicator 15, which is ordinarily visible to both the passenger and the counter clerk. Under ordinary circumstances, the baggage or parcel is then tagged with an appropriate identification, its weight is noted, and it is then removed from the scale 14 by the clerk and forwarded, through appropriate loading chutes and conveyors to the airplane or other vehicle to be loaded. In some instances, after the baggage and parcels have been tagged, the passenger himself removes the parcel from the scale 14 and carries the item onto the airplane or other vehicle as a carry-on item.

The present invention is adaptable for use with many counter configurations other than those disclosed here. In general, the exterior ornamental design of the counter top and inspection would be left to the tastes of the individual terminal or airline. For example, the apparatus may be located adjacent to a moving conveyor which carries the luggage to the weighing station for weighing and tagging by the clerk. It is essential for the present invention only that the luggage, parcels, baggage, etc. stop for a moment on the weighing platform so that the balance of the inspection can be completed.

At the weighing station, while a package, or baggage indicated generally at "P" is on the weighing platform 14, the contents are examined by an X-ray fluoroscope and frequency modulation monitor device. To this end, the apparatus embodies an X-ray unit 18 mounted beneath the counter 11 on a support or chassis frame 19. The X-ray unit 18 is positioned on one side of the weighing platform 14. On the opposite side of the platform 14 there is provided a fluoroscopic screen 20. A series of mirrors 21, 22 and 23 enables both the check-in clerk and the passenger to view the contents of the parcels being inspected without being exposed to damaging X-ray beams. For purposes of shielding the passenger and the clerk from the X-ray, there is provided a sliding X-ray impervious shield 25. The shield 25 comprises an upper panel 25a and opposed depending panels 25b, and is made of lead or other X-ray impervious material. To open or enclose the weighing platform, the shield is mounted for reciprocating movement on an upper supporting frame or super-structure 26 mounted on the main frame 19. The superstructure carries a series of guide rollers 28 supporting the upper panel 25a of the shield 25. The shield 25 is moved back and forth to open or close the access to the weighing platform by a drive mechanism comprising a drive chain 29 secured to a lower edge of one of the depending panels 25b of the shield 25, and is driven by a sprocket 30 secured to a drive shaft of a motor 31. An idler sprocket 32 on the frame 19 supports the drive chain 29 at a point spaced from the drive sprocket 30. To prevent injury to a passenger or the clerk as a result of being caught by the sliding shield 25, the motor 31 desirably includes a sliding clutch (not shown).

The motor 31 is controlled by an electrical circuit and control panel 33 which includes the necessary on-off switches and limit switches 34 to insure that the X-ray unit may not be operated unless the shield is in place. To this end, limit switches 34 are provided adjacent weighing station to indicate when the shield is open or closed.

The drive motor, shield support and drive mechanism controls are all mounted on the frame 19 underneath the counter 11. Pilot lights on the control panel 33 are utilized to show that the unit is operative and to indicate the position of the shield, that is open or closed, and they also may be utilized to indicate when the X-ray unit is on and off.

For purposes of determining the presence of bombs or frequency definition devices, a frequency modulation monitor 35 mounted on the frame 19 adjacent the X-ray unit. The monitor 35 includes a coil antenna 36, and it is constructed to sense frequencies on a large scale, preferably from 50 kilohertz to 100 megahertz. Signals from the monitor are shown on an oscilloscope screen (not shown) located on or adjacent to the control panel 33. By the use of a variable control mechanism, the clerk can scan the parcels over a wide range of frequencies, and the presence of bombs or frequency definition devices will thereby be ascertained. Electrical circuits and control circuits for the control unit may utilize conventional circuit breakers limit switches, pilot lights and contacts. The system may be of any conventional construction known in the art, including both electrical and electronic devices.

In operation, a passenger places his luggage on the scale platform 11. The clerk then activates the motor 31 to slide the shield over the platform to protectively enclose the items thereon. When the shield is in place, the clerk actuates the X-ray 18 and fluoroscope 20 units and examines the luggage, parcels, etc. by observing the appearance thereof in the mirror 23. The mirror, and thus the contents are also visible to the passenger. If desired, an X-ray photograph may be taken by the inclusion of appropriate apparatus. Closed circuit television may also be used to advantage for the inspection. After or during the X-ray inspection, the clerk can also examine the items with the frequency modulation monitor to ascertain the presence of frequency detonation devices. When the examination is complete, the sliding shield is withdrawn, and the baggage and parcels proceed through the normal check-in channels.

While various forms of X-ray units, frequency modulation monitors, weigh in scales, closed circuit television, and like devices may be utilized in the present invention, it would be understood that there is no intention to limit the invention to the specific form disclosed. On the contrary, the intention is to cover all modifications, alternative constructions, equivalents and uses falling within the spirit and scope of the invention as expressed in the appended claims.

I claim:

1. In a baggage inspection apparatus comprising a frame, weighing means including a platform supported on said frame, X-ray and fluoroscope means supported on said frame adjacent said weighing platform, means for viewing said fluoroscope at a point remote therefrom, and frequency modulation monitor means positioned on said frame adjacent said X-ray means, the improvement comprising an X-ray impervious shield which comprises an upper panel and opposed depending panels, an upstanding superstructure on said frame, roller and track means supporting said shield on said superstructure for horizontal traversing movement back and forth over said scale platform for selectively enclosing said scale platform and the objects contained thereon to shield said objects and platform during operation of said X-ray and fluoroscope unit, means on said frame for driving said shield to position the same in shielding relation with respect to the scale platform, and limit switch means on said frame for preventing operation of said X-ray means when said shield is open, said shield further having an open end for exposing the objects contained in said scale platform to said frequency modulation monitor means during operation of said X-ray and fluoroscope unit.

* * * * *